United States Patent [19]

Arquie et al.

[11] 4,321,701

[45] Mar. 23, 1982

[54] DEVICE FOR DISPLACING THE READING HEAD OF A VIDEO DISC IN RADIAL AND VERTICAL DIRECTIONS

[75] Inventors: Louis Arquie; Claude Bricot, both of Paris, France

[73] Assignee: Thomson-CSF, Paris, France

[21] Appl. No.: 101,505

[22] Filed: Dec. 10, 1979

[30] Foreign Application Priority Data

Dec. 8, 1978 [FR] France .............................. 78 34649

[51] Int. Cl.³ .............................................. G11B 7/08
[52] U.S. Cl. ..................................................... 369/45
[58] Field of Search ............. 358/128.5; 179/100.1 G, 179/100.3 L, 100.3 Y; 360/105, 106; 318/115; 335/222–225; 369/44, 45, 46, 100, 111, 112, 119

[56] References Cited

U.S. PATENT DOCUMENTS

| | | |
|---|---|---|
| 3,530,258 | 9/1970 | Greg et al. |
| 3,881,139 | 4/1975 | Inaba et al. ...................... 318/115 X |
| 3,969,574 | 7/1976 | Janssen et al. ................ 179/100.1 G |
| 4,092,529 | 5/1978 | Aihara et al. ...................... 369/44 X |
| 4,129,930 | 12/1978 | Dragt ............................ 179/100.1 G |
| 4,135,206 | 1/1979 | Kleuters et al. ............. 179/100.1 G |
| 4,190,775 | 2/1980 | Sakurai et al. ................ 179/100.1 G |

FOREIGN PATENT DOCUMENTS

| | | |
|---|---|---|
| 2126324 | 3/1971 | Fed. Rep. of Germany . |
| 2645326 | 4/1977 | Fed. Rep. of Germany . |
| 2908413 | 10/1979 | Fed. Rep. of Germany ...... 360/106 |
| 2238210 | 2/1975 | France . |
| 2262849 | 9/1975 | France . |
| 51-114102 | 3/1977 | Japan . |

OTHER PUBLICATIONS

Patents Abstracts of Japan, vol. 1, No. 8, Mar. 16, 1977, p. 329 E 76.

*Primary Examiner*—Bernard Konick
*Assistant Examiner*—Donald McElheny, Jr.
*Attorney, Agent, or Firm*—Oblon, Fisher, Spivak, McClelland & Maier

[57] ABSTRACT

A device for providing access to information carried by a video disc comprises a fixed magnetic circuit having an air-gap which extends parallel to the radius of the disc. The access device is provided in addition with a low-weight moving system comprising at least one electric circuit forming a flat coil which is capable of sliding vertically within the air-gap and is so arranged that horizontal conductors are placed within the air-gap. Radial tracking and track-to-track transfer can be carried out by means of an electric circuit, at least one vertical conducting element of which is placed within the air-gap. Fast access is obtained by displacing this low-weight moving system.

7 Claims, 12 Drawing Figures

DEVICE FOR DISPLACING THE READING HEAD OF A VIDEO DISC IN RADIAL AND VERTICAL DIRECTIONS

BACKGROUND OF THE INVENTION

1. Field of the Invention

This invention relates to the field of information storage on media designed for optical reading by means of focused radiation and is more particularly directed to an access device having one track carried by a medium which can be optically recorded or read, and to an optical system comprising an access device of this type.

2. Description of the Prior Art

The general progress achieved in laser techniques and thin films as well as in the technique of position-control systems has made it possible to produce an optically readable information medium which has the shape of a disc approximately thirty centimeters in diameter and on which $10^{10}$ bits of information can be recorded.

A medium of this type can be employed in particular as a data-processing memory but it is necessary in this case to provide a device for fast access to the track, either for writing information at a predetermined point of a previously written smooth track or for reading the written information at any point of the track.

Information or data access devices of currently available types have been designed for discs on which the recorded information contains a video signal (video discs); devices of this type permit access to information in a few seconds and are sufficient for this application but no longer prove adequate for a data-processing application.

In known access devices of the prior art, correct radial positioning of the optical reading head is ensured by mechanical means for effecting either the displacement of the disc or the displacement of the reading head. When the reading head and the disc are correctly positioned with respect to each other, the circular or spiral track on which the information is to be recorded or has already been recorded is followed radially by means of a galvanometer mirror. Said mirror is capable of rotating about an axis which is parallel to the plane of the disc and this latter reflects the beam to the reading lens. The operation which consists in vertical position-control so that the reading light beam remains correctly focused on the disc is carried out by means of an electromagnetic coil which produces a vertical displacement of the reading lens.

The weight of the assembly formed by the optical head and the means for radial and vertical position-control can hardly be less than 300 g; and this entire assembly has to be displaced at the time of pre-positioning of the reading head with respect to the disc for fast access to a groove of the track. By reason of the fairly substantial weight to be displaced, the corresponding access times are therefore of long duration.

The present invention is directed to a device for providing access to information in which the moving system has a considerably lower weight than that of moving systems constructed in accordance with the prior art and consequently permits a considerable reduction in access times.

SUMMARY OF THE INVENTION

According to the invention, the device for providing access to a groove of a track carried by a disc-type medium essentially comprises a stationary magnetic circuit having at least one linear air-gap extending parallel to the radius of the disc and located vertically above the recorded annulus of the disc, a uniform magnetic field being produced in at least part of the air-gap. The access device is further constituted by a moving system located within said air-gap and comprising an optical head, and by at least one electric circuit comprising horizontal conductors placed within the magnetic field and closed outside the magnetic circuit in order to produce a vertical force which ensures vertical displacement of the moving system. The moving system can be provided in addition with a circuit comprising vertical conductors placed within the magnetic field in order to produce a radial force which ensures radial displacement of the moving system for radial following and track-to-track transfers. Rapid radial advance of the reading head can be initiated by a radial force produced by vertical conductors within the magnetic field or produced by a linear motor which exerts said radial force on the moving system.

The optical recorder or the optical reader in which provision is made for a device of this type comprises control loops for controlling the intensities of the currents which flow through the conductors. The total weight of the moving system need not exceed approximately fifteen to twenty grams and makes it possible to carry out positioning of the optical head in considerably less time than access devices of the prior art.

BRIEF DESCRIPTION OF THE DRAWINGS

A more complete understanding of the invention will be gained from the following description in which further distinctive features will become apparent, reference being made to the accompanying drawings in which.

DESCRIPTION OF THE PREFERRED EMBODIMENTS

The access device is described precisely within the field of optical reading of media on which the information is recorded. The same access device can be employed, however, for recording information on a medium on which a smooth track has previously been recorded, the information being written on said track.

Figure 1:
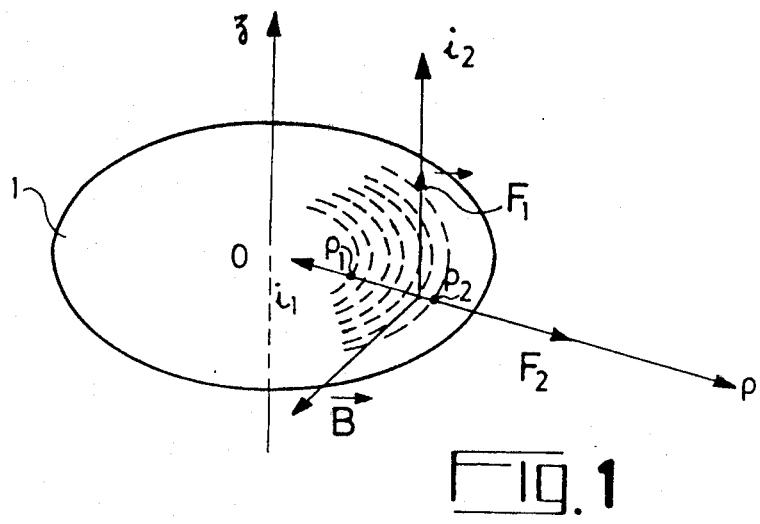
FIG. 1 shows diagrammatically the information disc medium and the forces to be applied to the reading head for radial control and vertical control.

In FIG. 1, a disc 1 carrying elements of information recorded either on concentric circles or on a spiral (partially shown in the figure) forms a track having a width which is less than one micrometer (0.6 μm) and a small depth (0.15 μm), the pitch between tracks being smaller than 2 μm (1.6 μm, for example). In a typical case, the information recording disc has a diameter of about 30 centimeters and the elements of information are recorded on an annulus having a radius of about 10 cm. Reading (and recording) of a track is carried out by a laser beam focused on the disc by means of a wide-angle lens of the microscope-lens type. In consequence, a small variation in the disc-lens distance results in defocusing which interferes with the reading operation by reason of the fact that this latter is based on phenomena involving diffraction of the radiation concentrated on the disc by the relief which is written on the track. In reading devices which are intended for this type of disc, provision must be made for a vertical-motion focusing control system since the mechanical properties of the disc are not sufficient to ensure that the reading signal is correct when a control system of this type is not provided. The reading devices employed at the present time carry out this function by means of a moving solenoid rigidly fixed to the reading lens which is slidably mounted in a circular air-gap. It is also necessary to provide a device for radial following of the track. In the radial direction, positioning accuracy of the reading spot must be of the order of 0.1 μm in order to ensure good reading of the track. Reading devices employed at the present time carry out radial tracking by means of a galvanometer mirror which is capable of rotating about an axis parallel to the plane of the disc and at right angles to the radius. Said mirror is placed above the optical head and receives the laser beam. Radial positioning of the optical reading head with respect to the disc is ensured by mechanical means. Thus a motor which drives a lead-screw carries out displacement of the disc or of the optical head in said radial direction.

In this type of device, the moving masses are of substantial value, namely 200 to 300 g in the case of the assembly formed by the pot magnet which ensures vertical position-control, the galvanometer mirror, the reading lens and the magnet which ensures radial position-control. In point of fact, the force which is necessary in order to produce a displacement of this assembly is proportional to the mass to be set in motion. Moreover, should it be desired to displace the same assembly in a radial direction for fast access to a track in said radial direction, the necessary accelerations are of very high value.

The invention proposes a device for effecting vertical position-control and radial position-control by displacement of a moving system of very low weight (approximately twenty grams at the most), these positioning operations being controlled by means of currents which are proportional to the displacements to be obtained. Said moving system can then be rapidly displaced in a radial direction for fast access and is subjected to accelerations of considerably higher value than those which it was possible to obtain in known devices of the prior art. To this end, conductive elements carrying control currents are placed in a stationary magnetic field produced at right angles to the radius and extending over the entire useful length of the disc radius ($\simeq 10$ cm), said moving elements being capable of displacement in said magnetic field and the reading lens being rigidly fixed to said elements.

Figure 2:
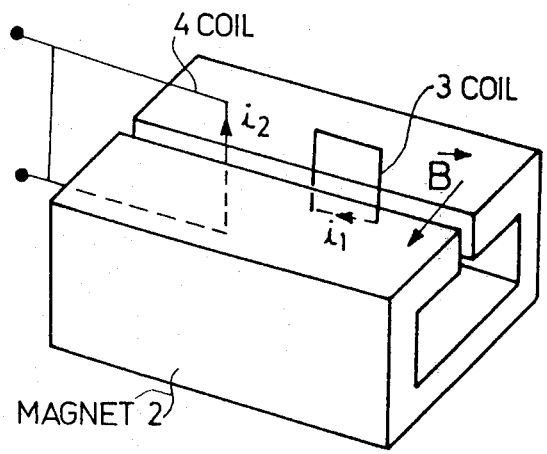
FIG. 2 shows a vertical magnetic circuit and the current elements which are necessary in order to produce these forces.
Figure 3:
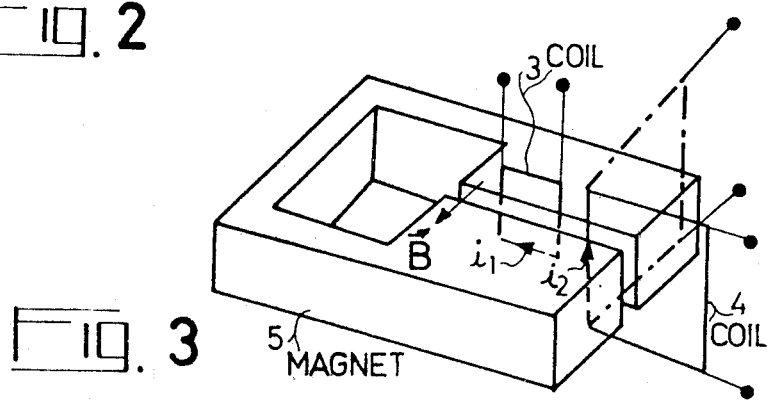
FIG. 3 shows a horizontal magnetic circuit and the current elements which are necessary in order to produce said forces.

FIG. 1 shows the forces $F_1$ and $F_2$ to be produced in order to obtain respectively a vertical position-control and a radial position-control of the reading head. These forces $F_1$ and $F_2$ are produced by means of linear conductive elements which are directed respectively in the radial direction ($\rho$) and in the vertical direction (z) and supplied with currents $i_1$ and $i_2$. Said elements are placed in a magnetic field B and this latter extends at least between the abscissae $\rho_1$ and $\rho_2$ between which the grooves of the disc are cut. To this end, the device according to the invention makes use of a permanent magnet or an induction coil for producing a uniform magnetic field within a vertical flat air-gap. FIGS. 2 and 3 show two types of magnetic circuits which can be employed.

FIG. 2 shows a permanent magnet formed by a vertical magnetic circuit 2. Two flat coils are so arranged that the first coil 3 has horizontal circuit elements within the air-gap so as to produce a vertical force when a current $i_1$ flows through said coil. The second coil 4 has vertical circuit elements within the air-gap so as to produce a force in the direction of the air-gap when a current $i_2$ flows through said coil. The electric circuits and the magnetic circuits are closed in order to prevent generation of forces which would cancel the useful forces. In the two cases shown in FIGS. 2 and 3, the electric circuits are closed outside the air-gap. The magnetic circuit is oriented in such a manner as to ensure that the direction of the air-gap corresponds to a radial direction of the disc.

Figure 4:
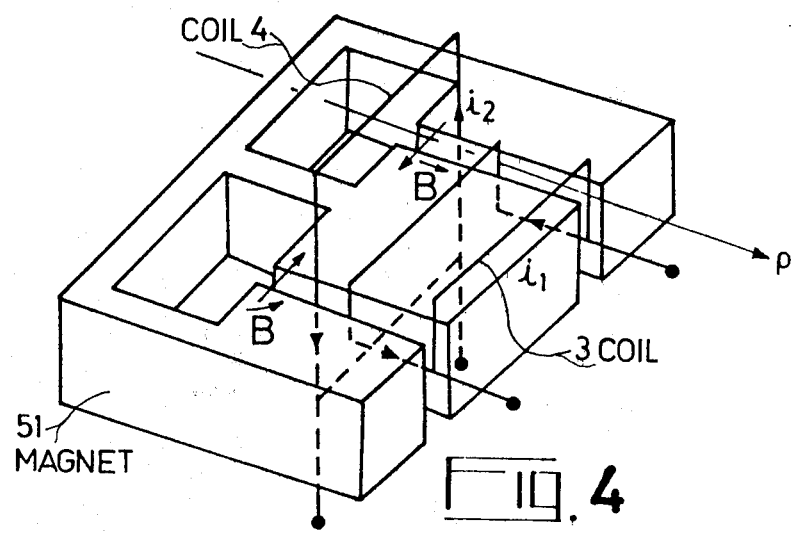
FIG. 4 shows a horizontal magnetic circuit having two air-gaps.
Figure 5:
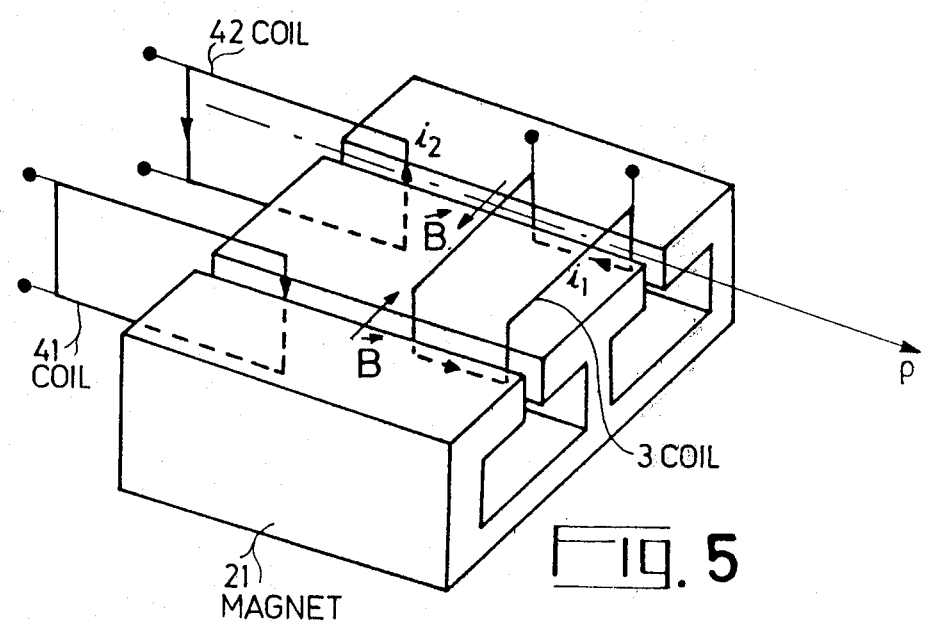
FIGS. 5 and 6 show two embodiments of a vertical magnetic circuit having two air-gaps.
Figure 6:
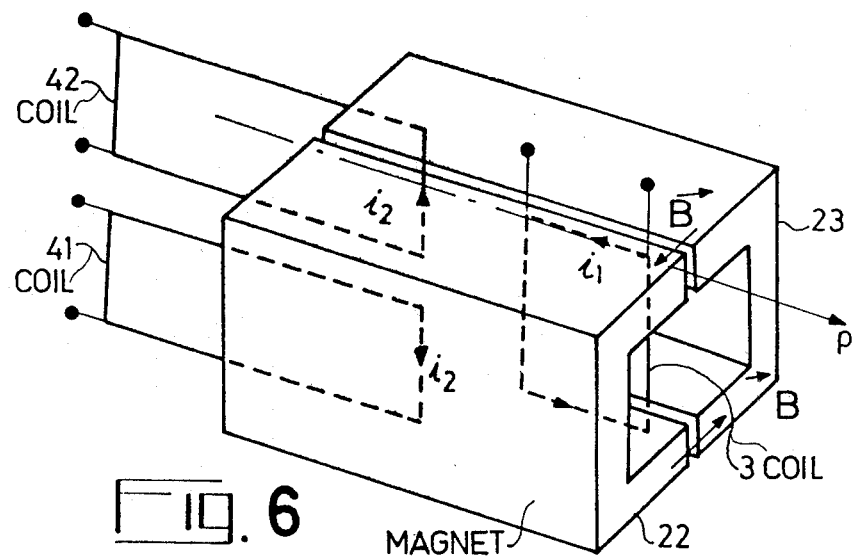

FIG. 3 shows a permanent magnet formed by a horizontal magnetic circuit 5. The flat coils 3 and 4 can be placed within the air-gap in the same manner as in the magnetic circuit of FIG. 2. However, the coil 4 can also be arranged as shown in chain-dotted lines in the figure so as to surround a pole-piece. These two coils are closed outside the air-gap as in the previous instance. In practice, it is necessary to ensure that the two coils 3 and 4 are mechanically coupled, the lens which is secured to the assembly being thus capable of displacement simultaneously in the radial and vertical directions. The electric circuits can also be closed within a second air-gap which is parallel to the first and in which the magnetic field is in the opposite direction with respect to the magnetic field within the first air-gap. A structure of this type accordingly makes it possible in respect of a constant value of current to double the resultant force applied to the coil in comparison with structures consisting of only one air-gap. The current flows in opposite directions within the conductive elements, said elements being placed respectively within these two air-gaps in which the magnetic fields are oppositely directed. FIGS. 4, 5 and 6 illustrate design solutions of this type.

FIG. 4 shows a horizontal magnetic circuit 51 having two air-gaps in which the magnetic fields are in opposite directions. The coil 3 is placed horizontally outside the magnetic circuit and folded at right angles at its two ends, with the result that the circuit elements which are parallel to the radial direction are placed respectively within the two air-gaps. The flat coil 4 is vertical and perpendicular to the air-gap and surrounds the central pole-piece so that the vertical circuit elements are placed within the two air-gaps, the forces generated being added in order to ensure radial displacement of the coil.

FIG. 5 shows a vertical magnetic circuit 21 having two air-gaps in which the coil 3 for obtaining the vertical force has the same shape as the coil shown in FIG. 4. The electric circuit for obtaining the radial force is formed by two coils 41 and 42 disposed vertically and parallel to the air-gaps. These electric circuits are closed outside the air-gaps as in the design solutions described with reference to FIGS. 2 and 3. The two coils aforesaid are supplied with currents which flow in opposite directions, thereby ensuring cooperation of the generated forces in order to obtain the radial displacement. As in the previous instance, the three electric circuits must be mechanically coupled so that the reading lens which is suspended from the assembly can be displaced at the same time in both the radial and vertical directions.

FIG. 6 shows another design consisting of two air-gaps in which the magnetic circuit is constituted by two portions 22 and 23 which form two vertical coplanar air-gaps. In this case the coil 3 is placed in parallel relation to the air-gaps so as to ensure that the horizontal electric circuit elements through which the same current flows in opposite directions are placed within these two air-gaps. As in the solution described with reference to FIG. 5, two electric circuits 41 and 42 comprising vertical conductive elements placed within the two air-gaps are so designed as to have combined effects and to produce a radial displacement of the assembly. Moreover, as in the previous embodiments, the three electric circuits must be mechanically coupled to each other.

Figure 7:
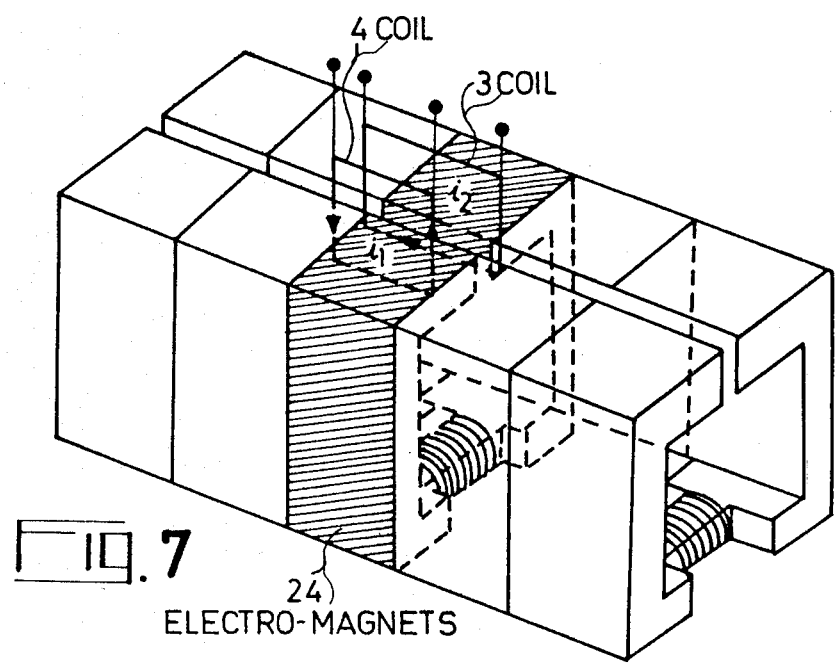
FIG. 7 shows a vertical magnetic circuit having a commutating field.

In all the solutions described earlier with reference to FIGS. 2 to 6, the uniform magnetic field is produced within the entire air-gap. The coils must therefore have a length which exceeds the length of the air-gap in order to ensure that the electric circuits are closed outside the field. One solution which makes it possible to avoid the disadvantage arising from the large size and resultant weight of the radial displacement circuits is shown in FIG. 7. The magnetic circuit is a vertical circuit in which the air-gap is oriented in the same manner as the air-gap shown in FIG. 2 but in which the magnetic field is produced only over a fraction of the total length. To this end, the magnetic circuit is constituted by a plurality of electromagnets in adjacent relation as designated by the reference 24, only one of these electromagnets being active at a given moment. Switching from one element to the adjacent element is performed progressively as the moving system travels in the radial direction. Thus the size of the electric circuit 4 for effecting the radial displacement can be reduced to the length of the electromagnets.

When the magnetic circuit has been defined, the moving system must then be guided in such a manner as to prevent any oscillations and must be sufficiently rigid to prevent any resonance.

Figure 8:
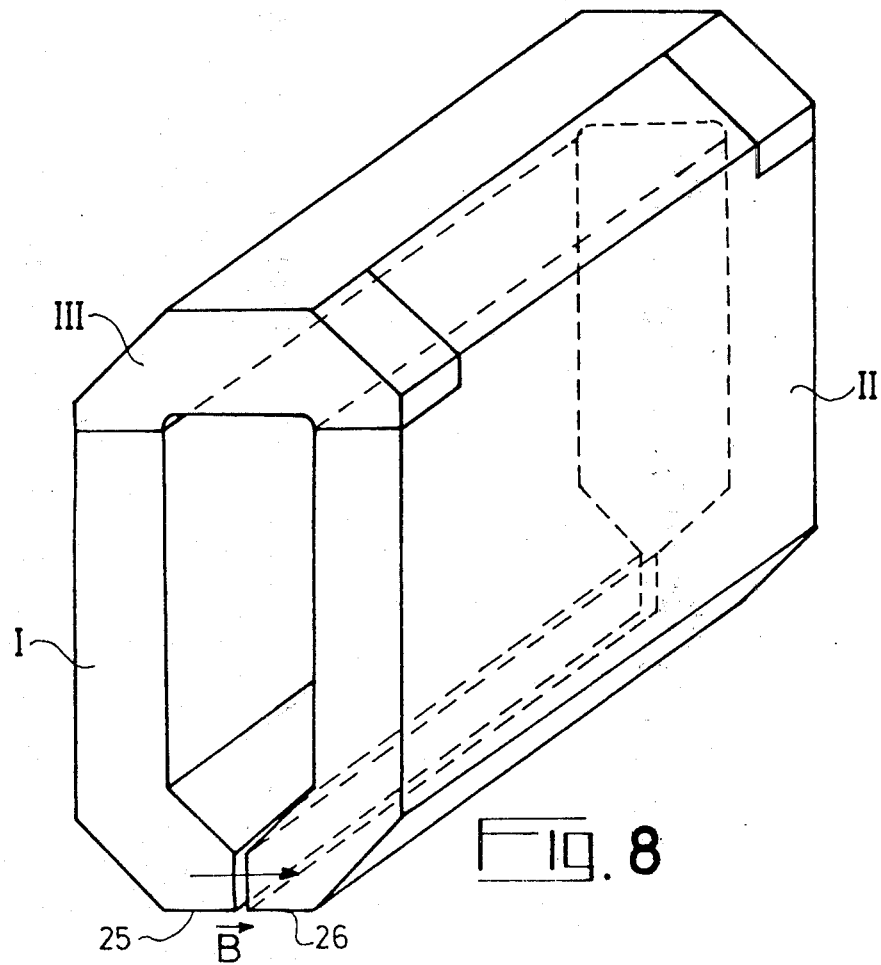
FIG. 8 shows a more distinctive embodiment of the magnetic circuit of FIG. 2.
Figure 9:
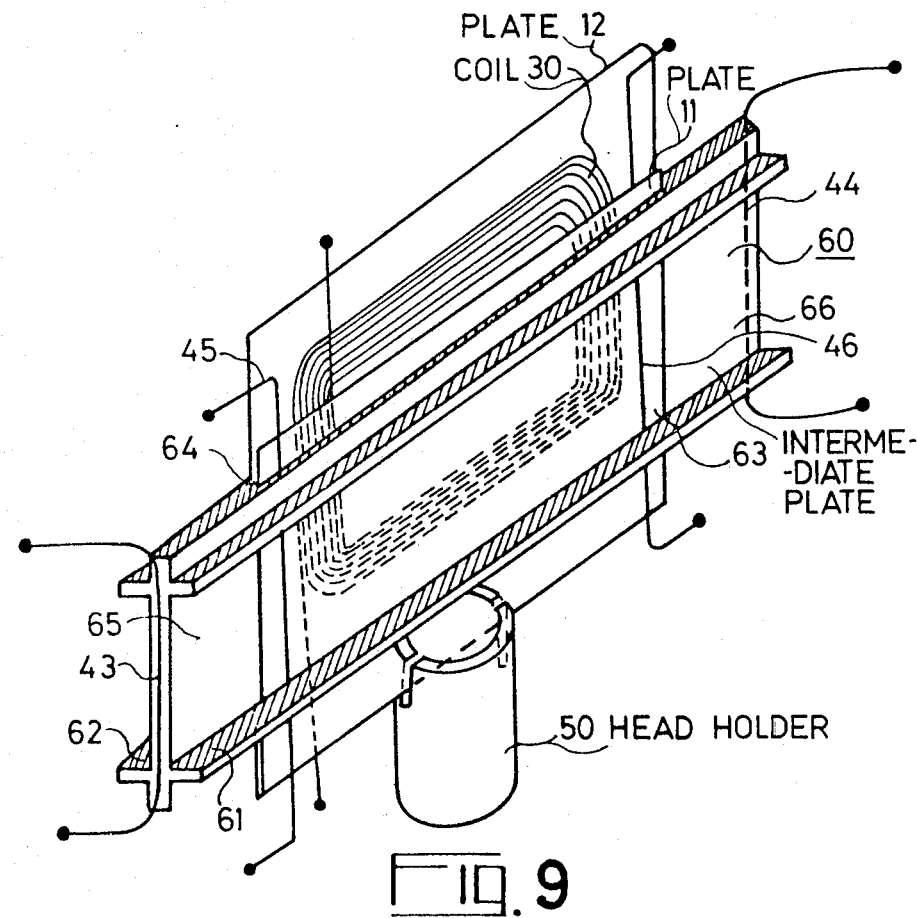
FIG. 9 shows an assembly formed by a guide, by a plate which carries the necessary electric circuits and by the reading head, thus making it possible in conjunction with the magnetic circuit of FIG. 8 to produce a vertical displacement and a radial displacement of the reading head with respect to the disc.

FIG. 9 shows the moving system and FIG. 8 shows a particular example of magnetic circuit of the type illustrated in FIG. 2 and associated with said moving system. The magnetic circuit is designed in three sections I, II and III and can be either a permanent magnet or an electromagnet circuit; in the case last mentioned, inductance coils are wound around the sections I and II in a direction such that the magnetic induction within the air-gap is the induction B as shown. The width of the air-gap can be adjusted by means of shims of non-magnetic material such as bronze-beryllium, for example. The magnetic field produced along the air-gap can be of the order of 1.5 Tesla Whilst the width of the air-gap is of the order of 1 to 2 mm. The two faces of the air-gap are ground and subjected to a microfluonation treatment in order to ensure that sliding of the moving system within the air-gap takes place as smoothly as possible.

The single air-gap design has been adopted since the faces of the two air-gaps in the double air-gap design must be perfectly parallel in order to ensure good operation of the device and this entails the need for mechanical accuracy of alignment which may prove difficult to obtain. As indicated earlier, however, the double air-gap designs may prove advantageous in order to increase displacement forces.

The flat electric circuits can be formed as follows: a copper wire is moistened with polymerizable adhesive and wound on a former of rectangular shape. After polymerization of the adhesive, the coil 30 which has thus been formed is removed from the mold. By reason of its small thickness, the circuit thus obtained is not sufficiently rigid; in order to obtain the necessary degree of rigidity for good sliding motion, the circuit is bonded between two thin glass plates 11 and 12 having perfectly flat surfaces. In FIG. 9, the coil 30 is seen partly in transparency through the plate 11. Vertical wires 45 and 46 are placed between the two plates. These wires can be employed in order to carry out the radial displacement which is necessary for radial follow-up of the track-to-track transfer control.

Another method for forming the flat electric circuits consists in making use of a printed circuit formed on a previously ground ceramic element. By employing a double-face printed circuit, each of the two circuits corresponding respectively to radial position-control and to vertical position-control can be printed on one of these two faces.

Figure 10:
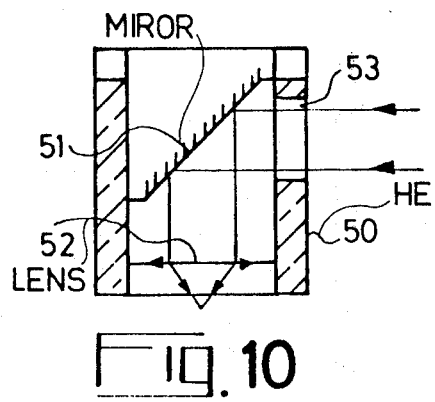
FIGS. 10 and 11 show two embodiments of the optical head to be attached to the plate which carries the electric circuits so as to form the moving system.
Figure 11:
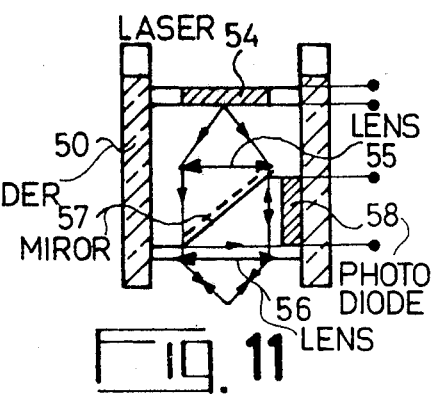

Small plates of this type which carry the electric circuits have a weight which does not exceed 5 to 7 g. The optical head to be displaced is attached to the plate thus formed. Said optical head is contained within a cylinder 50 of "rilsan" or of "plexiglas"; the latter makes it possible to bond the different optical elements together more readily. FIGS. 10 and 11 are vertical sectional views illustrating two examples of optical heads.

In FIG. 10, the optical head is intended to receive the radiation from an external source. Said head comprises a deviating mirror 51 which is stationary with respect to the head and a lens 52 of the microscope type (wide-angle lens) which is attached to the cylindrical casing 50, a lateral opening 53 being formed in said casing for receiving the beam. When the optical head is intended to permit reading by reflection of the disc, said head can be provided in addition with a semi-transparent plate placed between the lens and the mirror but it may prove more simple to mount said semi-transparent plate externally of the optical head between the mirror and the source.

FIG. 11 illustrates a second embodiment of the optical head which comprises an integrated source 54 placed within the head itself. Said source can be a semiconductor laser. Two lenses 55 and 56 are rigidly fixed to the casing 50 and serve to focus the radiation emanating from the laser. This second embodiment of the optical head is advantageous in the field of application of an optical reader which makes use of a device for producing a displacement of the moving system of the type shown in FIGS. 8 and 9. There is in fact no longer any need to be concerned with the problem of positioning the source with respect to the optical head. In the case of reading by reflection, it is also possible to place within the optical head a semi-transparent element 57 and an integrated detecting device 58 of the photodiode type. It is necessary in this case to provide conductors for supply of the laser and output conductors for the detector which are not liable to interfere with the sliding motion of the moving system as a whole.

In order to guide the small plate in its movements and more particularly in its horizontal movements, the moving system of FIG. 9 further comprises an intermediate member 60 which is stationary with respect to the air-gap except for the movement of rapid radial travel, the force required for said rapid radial travel being applied directly to said intermediate member. As shown in FIG. 9, said member 60 is inserted in the air-gap of the magnetic circuit, for example within the air-gap of the circuit shown in FIG. 8, in such a manner as to ensure that the horizontal faces 61 and 62 are applied against the faces 25 and 26 of the pole-pieces. Slots 63 and 64 are formed in the member 60 and the small plate which carries the electric circuits is inserted in said slots. A clearance of a few tens of micrometers is provided so as to permit displacement in the radial direction by means of a current applied within the conductors 45 and 46 for radial follow-up and track-to-track transfer. By applying the same principle, rapid radial travel can be obtained by bonding vertical wires 43 and 44 to the vertical faces of the two ends of the member 60. For an application in which an access time of the order of 200 ms is found to be acceptable, a current of 5 A passed through said wires 43 and 44 would be sufficient to generate a force which initiates the horizontal movement of the assembly. In the case of shorter access times, it is possible to employ more conventional means of the linear motor type which act on the member 60. The vertical faces such as the faces 65 and 66 applied against the vertical faces of the air-gap are intended to guide the horizontal sliding motion of the complete assembly.

The invention is not limited to the embodiments which have been specifically described in regard to the magnetic circuit and in regard to the moving system. The device for providing access to information must comprise a magnetic circuit having an air-gap which extends over the useful portion of the radius of the disc in which a uniform magnetic field is produced. The moving system is displaced within said air-gap in vertical and horizontal motion by means of currents which flow both horizontally and vertically within said air-gap, said currents being defined by conducting circuits of small mass which are closed outside the air-gap.

The device further comprises means which serve to guide the circuits and can be either the air-gap itself or a slot which is parallel to the air-gap and formed in an intermediate member. The optical head forms part of the moving system and is designed so as to be as light in weight as possible. The low weight of the vertically displaceable assembly can permit the possibility of carrying out vertical wobbling of the reading spot about a mean position which is variable as a function of the detected vertical defocusing, an alternating current being superimposed on a current having a variable direct-current component which corresponds to the mean position of the focusing spot on the optical axis. In order to ensure that the conductors which serve to supply the conducting circuits placed within the air-gap do not interfere with the movement of the moving system, the stationary magnetic circuit can be provided with mercury contacts which perform a relaying function between the movable conducting circuits and the stationary external supply circuits. Moreover, since the intermediate member 60 is stationary except in the event of rapid radial travel, it is possible to form a first relay for the conductors 45, 46 and the coil 30 by connecting the ends of these conductors to contact points on the member 60. These contacts have been omitted from FIGS. 8 and 9 in order not to complicate the figures.

Figure 12:
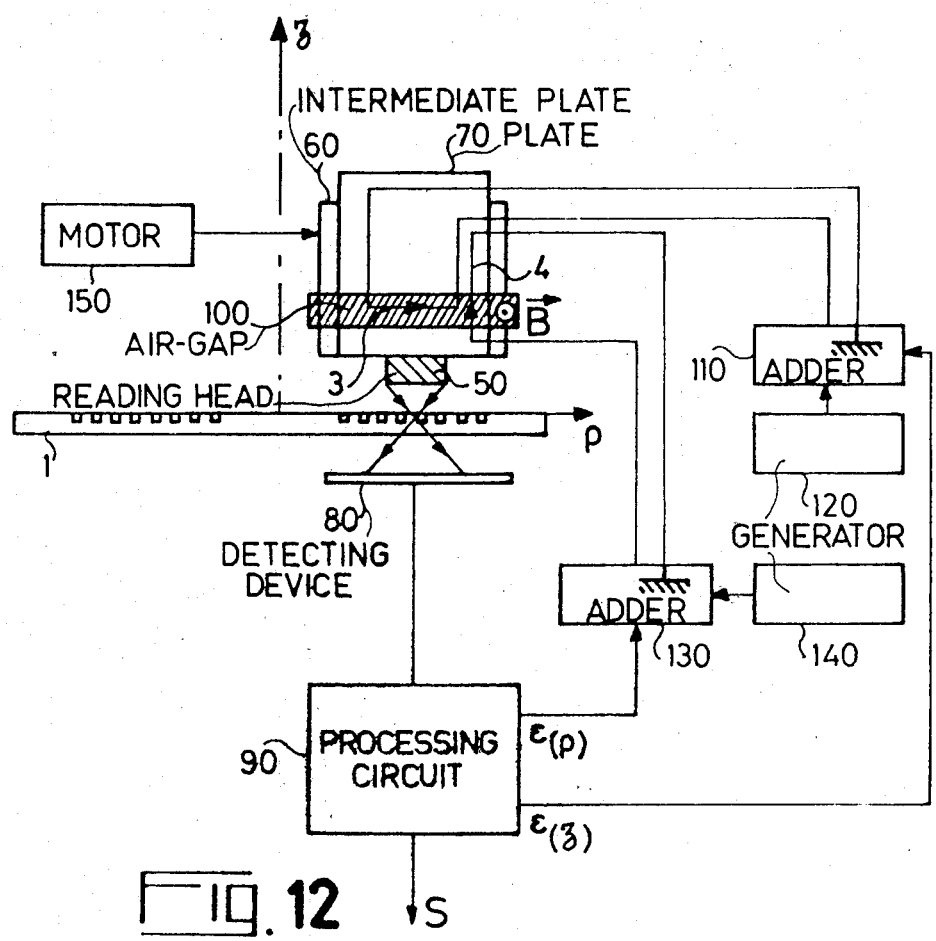
FIG. 12 shows diagrammatically an optical reader according to the invention.

FIG. 12 is a schematic presentation of an optical reader according to the invention. The same elements as in the preceding figures have been designated by the same reference numerals. The disc 1 rotates about a fixed axis z. A magnetic induction B parallel to the tangential direction of the tracks is produced within a vertical air-gap 100 by means of a magnetic circuit not shown in the figure. A small plate 70 which carries the electric circuits 3 and 4 respectively for vertical displacement and small-amplitude radial displacement is capable of horizontal and vertical sliding motion within said air-gap. The optical head 50 is rigidly fixed to said small plate. It has been assumed that the source was integrated within the head. Said plate 70 is rigidly fixed to an intermediate member 60 which is capable of moving for rapid radial travel. The reading device further comprises a device for detecting emergent radiation from the disc 80. It has been assumed in the figure that reading of the disc is performed by transmission. The detection device 80 is therefore placed on the other side of the disc with respect to the reading head and extends over the entire recorded portion of the disc. This arrangement is not intended to imply any limitation, however, and the optical head can be as shown in FIG. 11 in the case of a disc which permits reading by reflection whilst the detection device is located within the head itself. The output of the detection device 80 is connected to a signal-processing device 90. This processing device is of a type already known. (The detection device can comprise a plurality of suitably oriented photodetectors, each detector being intended to deliver a signal which is applied to the processing device).

The processing device delivers an information signal S, a focusing error signal $\epsilon(z)$ and a radial position error signal $\epsilon(\rho)$. The signal $\epsilon(z)$ is applied to a first input of an adder 110 and an alternating-current signal delivered by a generator 120 can be applied to the second input of said adder. The adder 110 which is mounted as a current generator is connected to the circuit 3 and controls the vertical displacement of the moving system. The signal $\epsilon(\rho)$ is applied to a first input of an adding circuit 130 and a signal $S_p$ formed of pulses delivered by a pulse generator 140 can be applied to the second input of said adding circuit. Each pulse corresponds to a radial advance of one track pitch and ensures track-to-track transfer. The adder 130 which is mounted as a current generator is connected to the circuit 4 and controls radial follow-up of the track and track transfer. For rapid radial travel, a linear motor 150 produces direct action on the intermediate member 60 which is rigidly fixed to the small plate which in turn carries the optical head.

The arrangement just described is not given in any limiting sense and, as explained in the foregoing, rapid radial travel can be controlled by a current flowing in a vertical conductor which is placed within the air-gap of the magnetic circuit.

Although it has been assumed in the foregoing that the information medium is provided in the form of a disc, the invention as hereinabove described is not limited to this arrangement. In particular, the medium can be designed in the form of an optically readable tape. In this case, the air-gap must extend at right angles to the direction of tape run and along the useful length. The direction of the magnetic field is always the same as the direction of tape run so that an electric circuit in which conductors located within the air-gap at right angles to the direction of tape run and at right angles to the plane of the medium produces a force which acts on the moving system in a direction parallel to the optical axis.

For following the track or transfer from one track to the adjacent track, an electric circuit comprises within the air-gap conductors which produce a force when supplied with current, said force being directed in the plane of the medium at right angles to the direction of tape run.

Moreover, as mentioned in the foregoing, the access device described within the field of application of optical reading can be employed in an optical recording device in which fast access to any zone of the disc is desired for writing information on a previously-written smooth track employed by counting the grooves traversed in order to locate the desired zone.

What is claimed is:

1. A device for displacing an optical reading head for reading information recorded on a circular track carried by a medium in the form of a disc, wherein said device comprises:
    a magnetic circuit having at least one flat air-gap extending at right angles to the disc along a radius of said disc above all the turns of the circular track;
    a moving system which is capable of displacement within said air-gap and is adapted to carry said optical head;
    at least a first electric circuit comprising a plurality of conductor portions at least one portion being parallel to the plane of the disc and placed within said air-gap for causing displacement of the moving system in order to maintain the optical system in focused relation to the track when a current is passed through said at least one portion along an axis at right angles to said disc.

2. A device as claimed in claim 1, wherein the first electric circuit is a flat rectangular coil at right angles to the disc and having four sides which are parallel in pairs, one side being placed entirely within said air-gap and the side parallel thereto is placed entirely outside said air-gap.

3. A device as claimed in claim 2, wherein said device further comprises at least a second electric circuit having a at least one portion at right angles to the plane of the disc and placed within said air-gap for causing displacement of said moving system in a radial direction with respect to the disc and causing said optical head to follow the track when an electric current is passed through said portion.

4. A device as claimed in claim 3, wherein said device further comprises at least a third electric circuit having a plurality of conductor portions at least one portion at right angles to the plane of the disc and placed within said air-gap so as to cause displacement of said moving system in a radial direction with respect to the disc when an electric current is passed through said portion and so as to cause rapid displacement of said optical head from any one turn of the track to any other turn of said track.

5. A device as claimed in claim 4, wherein said moving system comprises an intermediate member which is applied against said magnetic circuit for sliding on said magnetic circuit in a radial direction with respect to the disc and which is provided with a vertical slot parallel to a radius of the disc, and a small plate adapted to carry said optical head and placed within said slot so as to permit of vertical sliding motion of said plate within said slot in order to maintain focusing of said optical head on the track, said vertical slot being of greater length than said small plate so as to form a clearance space enabling said small plate to move in a radial direction and to cause said optical head to follow the track, said small plate being adapted to carry said first and second electric circuits and said intermediate member being adapted to carry said third electric circuit.

6. A device as claimed in claim 3, wherein said device further comprises a motor for rapidly displacing said optical head from any one turn of the track to any other turn of said track.

7. A device as claimed in claim 3, wherein said magnetic circuit is constituted by an array of electromagnets aligned in a radial direction with respect to the disc, said device being further provided with means for supplying said electromagnets with current one after the other in order to maintain in a magnetic field only that portion which is perpendicular to the second electric circuit.

* * * * *